US010436281B2

(12) United States Patent
Kim

(10) Patent No.: US 10,436,281 B2
(45) Date of Patent: Oct. 8, 2019

(54) HYDRAULIC ENGINE-MOUNT

(71) Applicants: HYUNDAI MOTOR COMPANY, Seoul (KR); KIA MOTORS CORPORATION, Seoul (KR)

(72) Inventor: Hyo Seok Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 15/799,412

(22) Filed: Oct. 31, 2017

(65) Prior Publication Data
US 2019/0017567 A1 Jan. 17, 2019

(30) Foreign Application Priority Data
Jul. 14, 2017 (KR) .......................... 10-2017-0089379

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01); *B60K 5/1225* (2013.01); *F16F 13/10* (2013.01)

(58) Field of Classification Search
CPC .......... F16F 13/107; F16F 13/10; F16F 13/08; B60K 5/1208
See application file for complete search history.

(56) References Cited

U.S. PATENT DOCUMENTS 4,852,864 A * 8/1989 Bitschkus ............. F16F 13/107
267/219
5,246,212 A * 9/1993 Funahashi ............... F16F 13/26
180/312
(Continued)

FOREIGN PATENT DOCUMENTS

JP 2014031850 A * 2/2014

Primary Examiner — Melanie Torres Williams
(74) Attorney, Agent, or Firm — Morgan, Lewis & Bockius LLP

(57) ABSTRACT

A hydraulic engine mount, capable of preventing a rattle noise, improving Noise, Vibration, and Harshness (NVH) performance by lowering dynamic characteristics of the hydraulic engine mount in an idling state, and capable of generating a high damping value in a state having a relatively large amount of vibration displacement, includes a case having a hydraulic fluid sealed therein, a nozzle plate having a lower nozzle plate and an upper nozzle plate coupled to an upper portion of the lower nozzle plate, and dividing an inside of the case into an upper fluid chamber and a lower fluid chamber, a first membrane disposed on the upper portion of the lower nozzle plate such that a first edge portion of the first membrane is tightly coupled to the upper portion of the lower nozzle plate, and provided with at least one first communicating hole, a second membrane disposed on a lower portion of the upper nozzle plate such that a second edge portion of the second membrane is tightly coupled to the lower portion of the upper nozzle plate, and provided with at least one second communicating hole, and a separation plate allowing the first membrane and the second membrane to be apart from each other so as to provide a flow space between the first membrane and the second membrane.

17 Claims, 7 Drawing Sheets

(56) References Cited

U.S. PATENT DOCUMENTS

2016/0053846 A1\* 2/2016 Nagasawa ............ B60K 5/1208
267/140.13
2017/0089421 A1\* 3/2017 Ueki ....................... F16F 13/10

\* cited by examiner

HYDRAULIC ENGINE-MOUNT

CROSS-REFERENCE TO RELATED APPLICATION(S)

This application is based on and claims the benefit of priority to Korean Patent Application No. 10-2017-0089379, filed on Jul. 14, 2017 with the Korean Intellectual Property Office, the disclosure of which is incorporated herein by reference.

TECHNICAL FIELD

Embodiments of the present disclosure relate to a hydraulic engine mount provided with a membrane having an improved structure to be mounted to a nozzle plate.

BACKGROUND

An engine of vehicle is installed in an engine room of a vehicle body through an engine mount so as to isolate and dampen vibration of an engine. A rubber mount that isolates and dampens the vibration through an elastic force of the rubber, and a hydraulic engine mount (fluid-filled type engine mount) in which a predetermined amount of hydraulic fluid is sealed, has been widely used for a passenger vehicle.

The hydraulic engine mount has a structure in which a predetermined amount of hydraulic-fluid is sealed therein to dampen the vibration in accordance with flow of the hydraulic-fluid, and has an effect of attenuating vibration simultaneously in a high frequency range and a low frequency range. Therefore, an application range of the hydraulic engine mount has been increased.

The hydraulic engine mount includes a case and an insulator and a diaphragm, wherein the insulator and diaphragm are coupled to an upper end portion and a lower end portion, respectively, inside of the case. The inner space of the case is divided into an upper fluid chamber and a lower fluid chamber by a nozzle plate.

In general, the nozzle plate is formed such that an upper nozzle plate and a lower nozzle plate are coupled to each other. In the center of the lower nozzle plate, a lower center hole is formed and an annular flow channel is formed along the outside of the circumference of the lower center hole. One end of the flow channel is communicated with the lower fluid chamber.

The upper nozzle plate is placed in the upper side of the lower nozzle plate. The upper nozzle plate includes an upper center hole formed in the center of the upper nozzle plate and a hole configured to allow the other end of the flow channel to communicate with the upper fluid chamber.

Since the upper fluid chamber and the lower fluid chamber communicate with the flow channel, the hydraulic fluid of the upper fluid chamber and the lower fluid chamber flows through the flow channel.

The flow of the hydraulic fluid through the flow channel is performed as an internal volume of the upper fluid chamber is increased or decreased when the insulator is elastically deformed by the load movement and vibration transmitted from the engine. In order to improve vibration characteristics and damping performance, a membrane may be mounted between the upper nozzle plate and the lower nozzle plate.

An edge of the lower surface of the membrane is fitted to the upper surface of the lower nozzle plate and an edge of the upper surface of the membrane is fitted to the lower surface of the upper nozzle plate.

An edge portion where the membrane and the lower nozzle plate are engaged with each other and an edge portion where the membrane and the upper nozzle plate are engaged with each other are apart from each other by a predetermined distance so that the hydraulic fluid of the upper fluid chamber and the lower fluid chamber can flow.

When idling, the hydraulic fluid flows around the edge of the membrane to lower its dynamic characteristics. The hydraulic fluid perform a damping function by flowing through only the flow channel when the large displacement.

However, excessive vibration of the membrane due to a clearance formed at the coupling portion of the membrane causes noise. Such the noise can be eliminated by reducing or eliminating the clearance. However, when the clearance is reduced or eliminated, the dynamic characteristics may be increased and Noise, Vibration, and Harshness (NVH) performance may be reduced.

SUMMARY

Therefore, it is an aspect of the present disclosure to provide a hydraulic engine mount capable of preventing a rattle noise and improving Noise, Vibration, and Harshness (NVH) performance by lowering dynamic characteristics of the hydraulic engine mount when idling, and capable of generating a high damping value when having a large displacement.

Additional aspects of the present disclosure will be set forth in part in the description which follows and, in part, will be obvious from the description, or may be learned by practice of the present disclosure.

In accordance with one aspect of the present disclosure, a hydraulic engine mount includes a case having a hydraulic fluid sealed therein, a nozzle plate having a lower nozzle plate and an upper nozzle plate coupled to an upper portion of the lower nozzle plate, and dividing an inside of the case into an upper fluid chamber and a lower fluid chamber, a first membrane disposed on the upper portion of the lower nozzle plate such that a first edge portion of the first membrane is tightly coupled to the upper portion of the lower nozzle plate, and provided with at least one first communicating hole, a second membrane disposed on a lower portion of the upper nozzle plate such that a second edge portion of the second membrane is tightly coupled to the lower portion of the upper nozzle plate, and provided with at least one second communicating hole, and a separation plate allowing the first membrane and the second membrane to be apart from each other so as to provide a flow space between the first membrane and the second membrane.

The at least one first communicating hole and the at least one second communicating hole may be disposed in different positions with respect to a vertical direction of the nozzle plate.

A lower center hole communicated with the lower fluid chamber may be provided in a central portion of the lower nozzle plate and an upper center hole communicated with the upper fluid chamber may be provided in a central portion of the upper nozzle plate.

The lower nozzle plate may comprise a flow channel formed in an annular shape along a circumference of the lower center hole to allow the hydraulic fluid to flow from the upper fluid chamber to the lower fluid chamber or from the lower fluid chamber to the upper fluid chamber and a first communicating portion provided in one end portion of the flow path to allow the flow channel to be communicated with the lower fluid chamber.

The upper nozzle plate may comprise a second communicating portion configured to allow another end portion of the flow channel to be communicated with the upper fluid chamber.

A distance between the first membrane and the second membrane may be greater than a displacement of the first membrane or the second membrane when a relatively small amount of vibration is generated in an idling state.

In the idling state, the hydraulic fluid of the upper fluid chamber may flow to the flow space by passing through the upper center hole and the at least one second communicating hole, and then may flow to the lower fluid chamber by passing through the at least one first communicating hole and the lower center hole.

In the idling state, the hydraulic fluid of the lower fluid chamber may flow to the flow space by passing through the lower center hole and the at least one first communicating hole and then may flow to the upper fluid chamber by passing through the at least one second communicating hole and the upper center hole.

A distance between the first membrane and the second membrane may be less than a displacement of the first membrane or the second membrane when a relatively large amount of vibration is generated.

When the relatively large amount of vibration is generated, the at least one first communicating hole and the at least one second communicating hole are blocked by the second membrane and the first membrane, respectively, and, the hydraulic fluid of the upper fluid chamber may be prevented from flowing to the lower fluid chamber through the flow space, and the hydraulic fluid of the lower fluid chamber may be prevented from flowing to the upper fluid chamber through the flow space.

When the relatively large amount of vibration is generated, the hydraulic fluid of the upper fluid chamber and the lower fluid chamber may flow through only the flow channel.

The separation plate may be formed in an annular shape, and the separation plate may comprise an opening portion of which a central portion is opened to form the flow space, a first locking protrusion protruding downward along a circumference of the opening portion, and a second locking protrusion protruding upward along the circumference of the opening portion.

The first membrane may comprise the first edge portion protruding downward from an edge of the first membrane and a first locking groove being recessed downward from an edge portion of an upper surface of the first membrane.

The second membrane may comprise the second edge portion protruding upward from an edge of the second membrane and a second locking groove being recessed upward from an edge portion of a lower surface of the second membrane.

The lower nozzle plate may comprise a first groove portion tightly coupled to the first edge portion and the upper nozzle plate comprises a second groove portion tightly coupled to the second edge portion.

Movement of the first membrane in a circumferential direction of the first membrane may be prevented, by having the first edge portion fixed to the first groove portion of the lower nozzle plate and the first locking protrusion of the separation plate locked to the first locking groove.

Movement of the second membrane in a circumferential direction of the second membrane may be prevented, by having the second edge portion fixed to the second groove portion of the upper nozzle plate and the second locking protrusion of the separation plate locked to the second locking groove.

In accordance with another aspect of the present disclosure, a hydraulic engine mount includes a case having a hydraulic fluid sealed therein, a nozzle plate having a lower nozzle plate and an upper nozzle plate coupled to an upper portion of the lower nozzle plate, and dividing an inside of the case into an upper fluid chamber and a lower fluid chamber, a plurality of membranes disposed between the lower nozzle plate and the upper nozzle plate and a plurality of separation plates allowing the plurality of membranes to be apart from each other so as to provide a flow space between each of the plurality of membranes, wherein the plurality of membranes each comprises at least one communicating hole communicated with the flow space.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
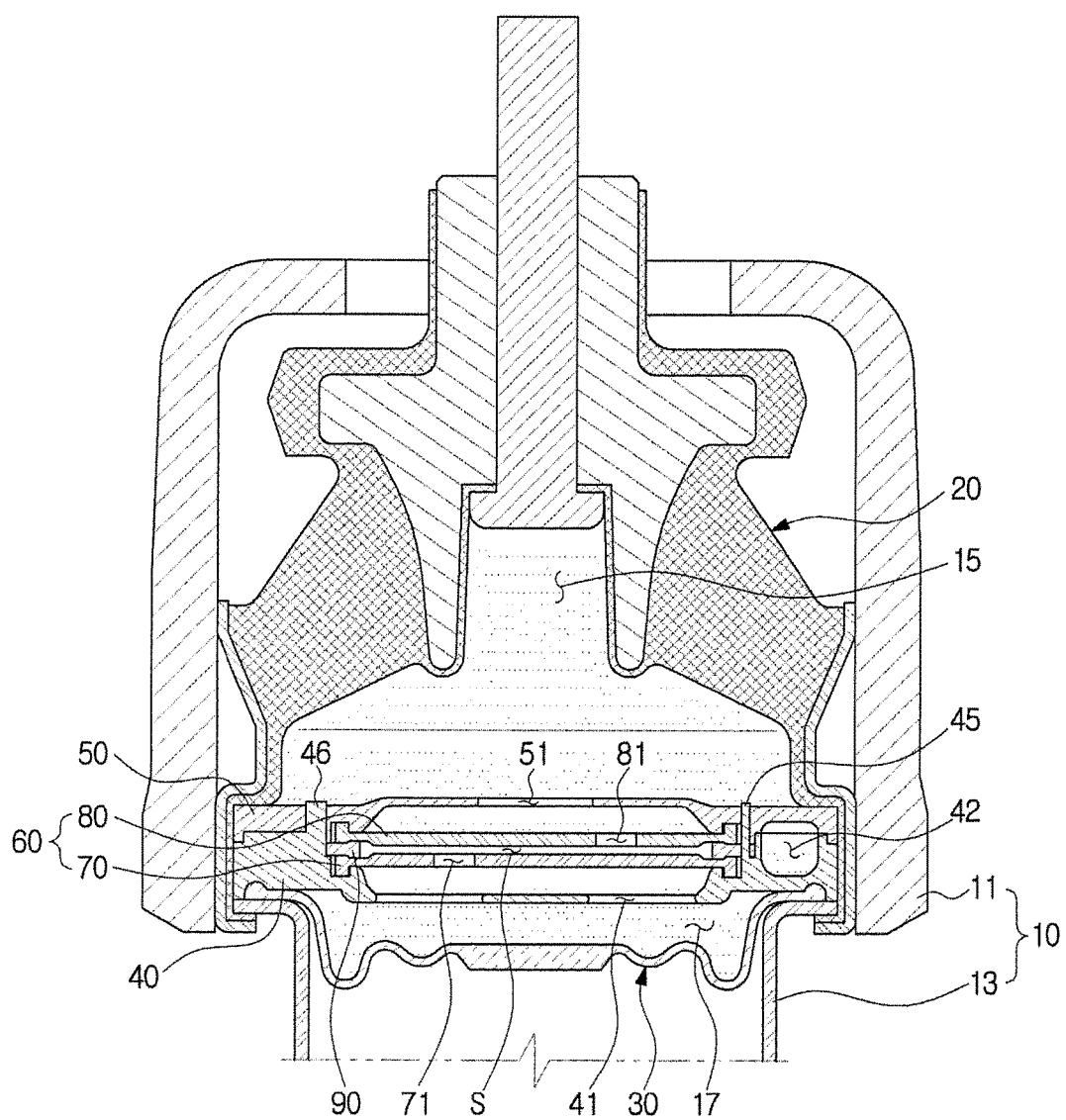
FIG. 1 is a cross-sectional view illustrating a hydraulic engine mount according to an embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following detailed description, the terms of "front end", "rear end", "upper portion", "lower portion", "upper end", "lower end" and the like may be defined by the drawings, but the shape and the location of the component is not limited by the term.

The present disclosure will be described more fully hereinafter with reference to the accompanying drawings.

Figure 2:
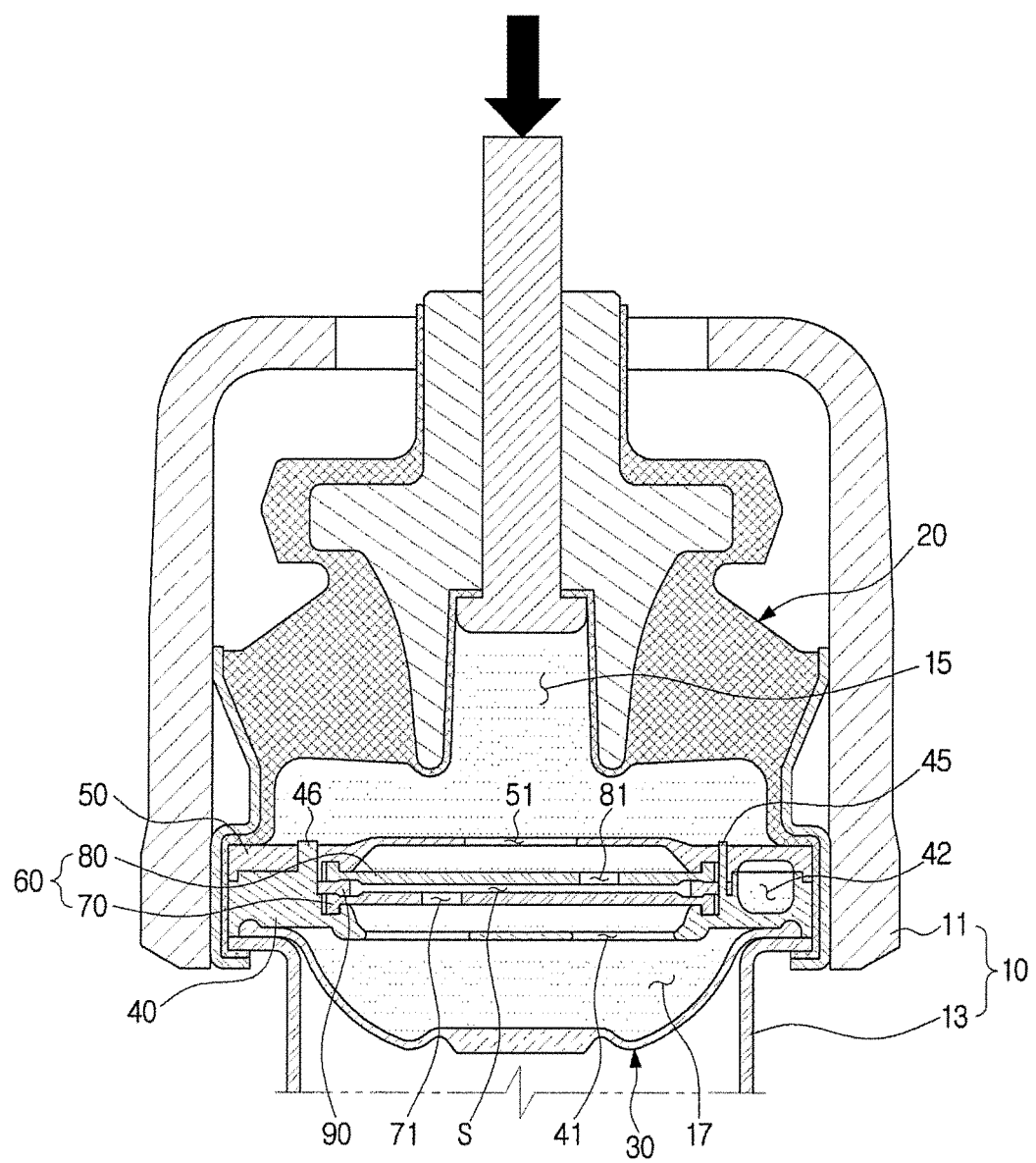
FIG. 2 is a view illustrating a case in which an internal volume of an upper fluid chamber is decreased and an internal volume of a lower fluid chamber is increased while hydraulic fluid flows from the upper fluid chamber to the lower fluid chamber since an insulator is elastically deformed by load movement and vibration transmitted from an engine.

FIG. 1 is a cross-sectional view illustrating a hydraulic engine mount according to an embodiment of the present disclosure. FIG. 2 is a view illustrating a case in which an internal volume of an upper fluid chamber is decreased and an internal volume of a lower fluid chamber is increased while hydraulic fluid flows from the upper fluid chamber to the lower fluid chamber since an insulator is elastically deformed by load movement and vibration transmitted from an engine.

As illustrated in FIG. 1, a hydraulic engine mount includes a case 10 forming an outer appearance and having a hydraulic fluid sealed therein, an insulator 20 coupled to an upper inside portion of the case 10, a diaphragm 30 coupled to a lower inside portion of the of the case 10, and a nozzle plate 40 and 50 disposed between the insulator 20 and the diaphragm 30 to divide an inner space of the case 10 into an upper fluid chamber 15 and a lower fluid chamber 17.

The case 10 includes an upper case 11 and a lower case 13 coupled to a lower end of the upper case 11. The inside of the case 10 is divided into the upper fluid chamber 15 and the lower fluid chamber 17 by the nozzle plate 40 and 50.

The insulator 20 and the diaphragm 30 are respectively coupled to the upper and lower ends of the case 10 and may be made of a material having elasticity.

In a state in which the internal volume of the upper fluid chamber 15 is increased, as illustrated in FIG. 1, when the internal volume of the upper fluid chamber 15 is reduced due to the elastic deformation of the insulator 20 by load and vibration transmitted from the engine, as illustrated in FIG. 2, the hydraulic fluid may flow from the upper fluid chamber 15 to the lower fluid chamber 17 and thus the internal volume of the lower fluid chamber 17 may be increased, thereby elastically deforming the diaphragm 30.

The insulator 20 and the diaphragm 30 may be elastically deformed by the load and vibration transmitted from the engine, and thus the internal volume of the lower fluid chamber 17 may be reduced and the internal volume of the upper fluid chamber 15 may be increased. Accordingly, the hydraulic fluid may flow from the lower fluid chamber 17 to the upper fluid chamber 15.

The flow of the hydraulic liquid may be performed through a flow channel 42 provided in a lower nozzle plate 40 and a description thereof will be described later.

The nozzle plate 40 and 50 divides the inner space of the case 10 into the upper fluid chamber 15 and the lower fluid chamber 17. The nozzle plate 40 and 50 includes a lower nozzle plate 40 and an upper nozzle plate 50 coupled to an upper portion of the lower nozzle plate 40.

The lower nozzle plate 40 includes a lower center hole 41 communicated with the lower fluid chamber 17, and the upper nozzle plate 50 includes an upper center hole 51 communicated with the upper fluid chamber 15. A membrane 60 is mounted between the lower nozzle plate 40 and the upper nozzle plate 50 to improve vibration characteristics and damping performance.

A detail configuration of the lower and upper nozzle plates 40 and 50 and the membrane 60 mounted therebetween will be described later.

Figure 3:
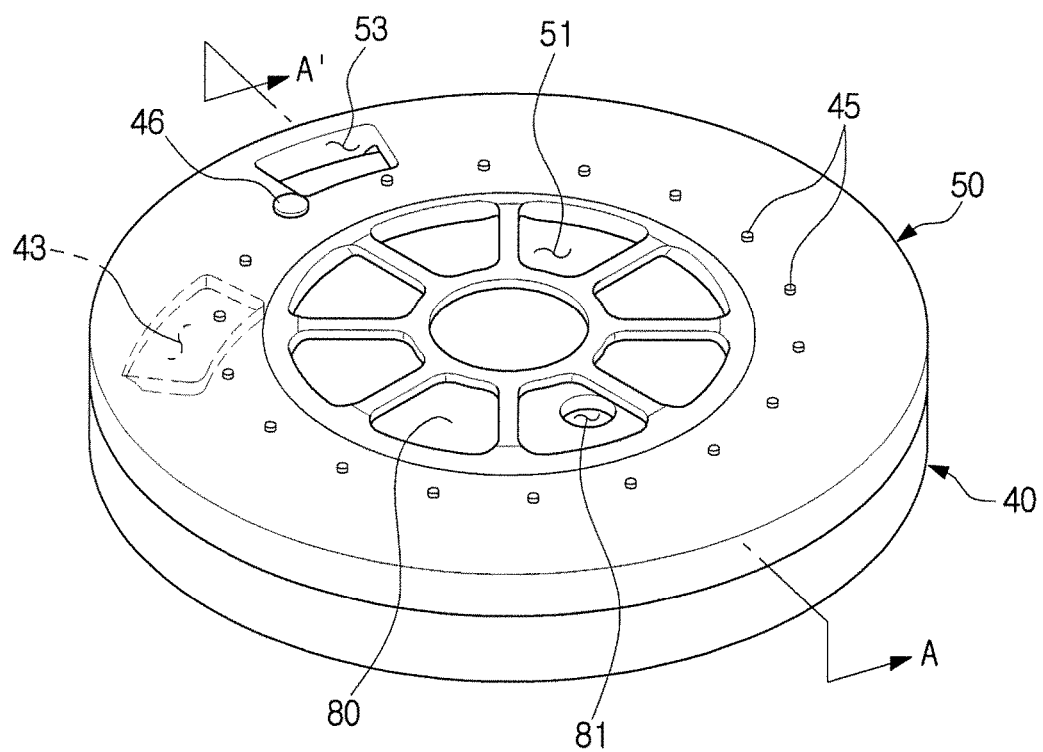
FIG. 3 is a perspective view illustrating a nozzle plate according to an embodiment of the present disclosure, when viewing from an upper side.
Figure 4:
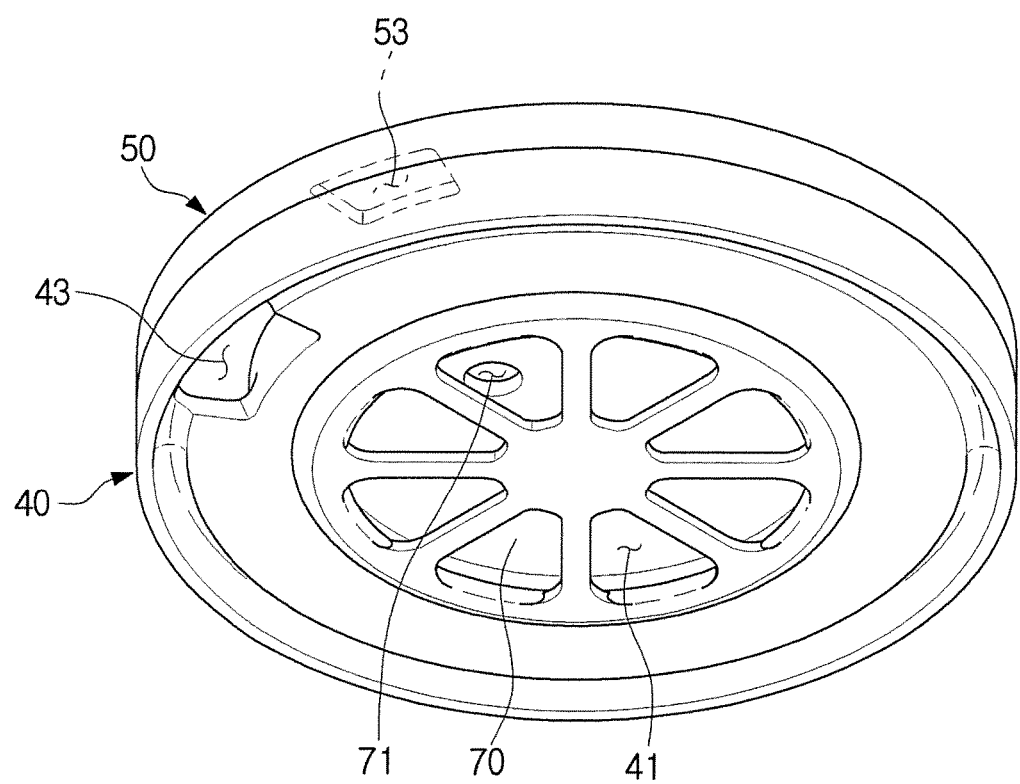
FIG. 4 is a perspective view illustrating the nozzle plate according to an embodiment of the present disclosure, when viewing from a lower side.
Figure 5:
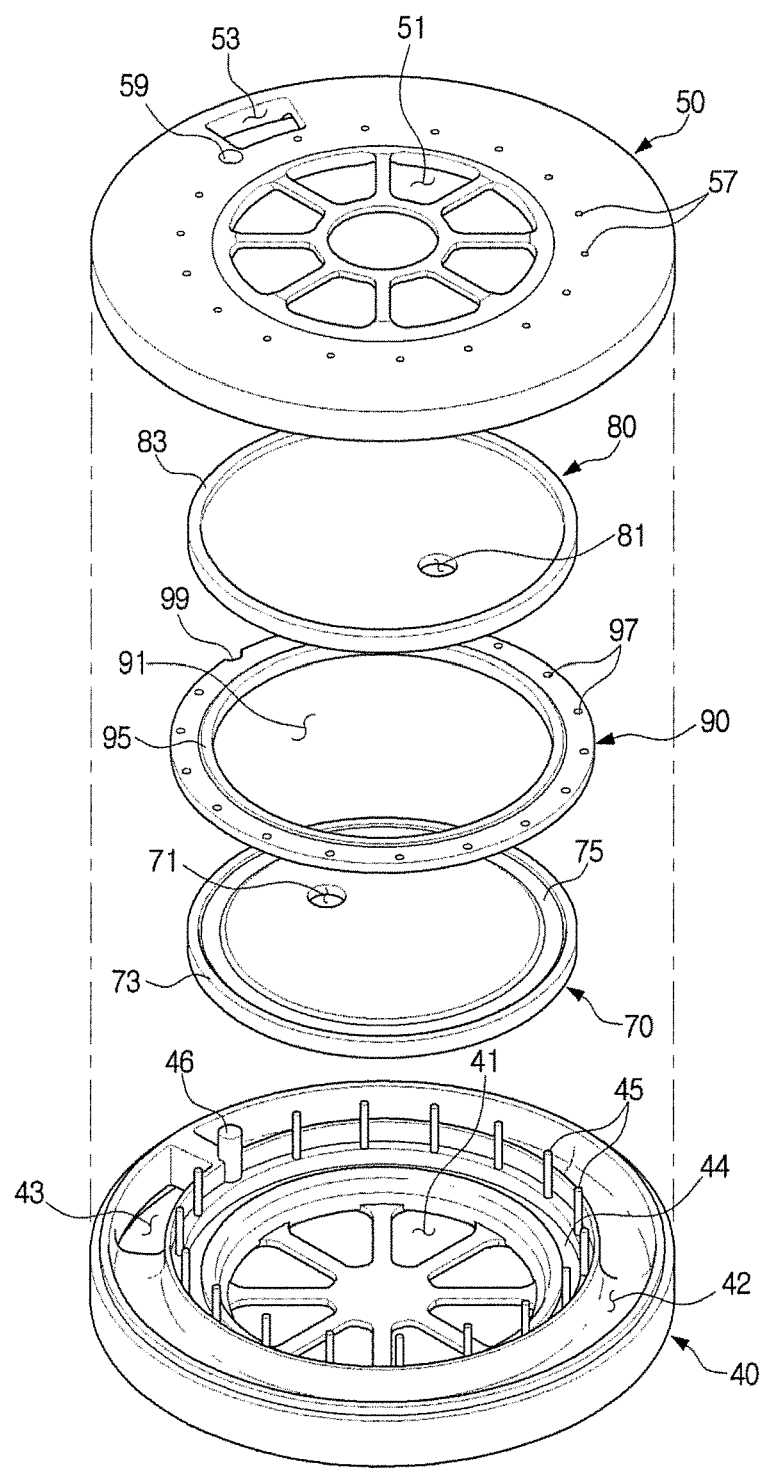
FIG. 5 is an exploded view illustrating the nozzle plate and a membrane mounted to the inside of the nozzle plate according to an embodiment of the present disclosure.

FIG. 3 is a perspective view illustrating a nozzle plate according to an embodiment of the present disclosure, when viewing from an upper side, FIG. 4 is a perspective view illustrating the nozzle plate according to an embodiment of the present disclosure, when viewing from a lower side, and FIG. 5 is an exploded view illustrating the nozzle plate and a membrane mounted to the inside of the nozzle plate according to an embodiment of the present disclosure.

As illustrated in FIGS. 3 to 5, the nozzle plate 40 and 50 includes the lower nozzle plate 40 and the upper nozzle plate 50 coupled to the upper portion of the lower nozzle plate 40.

The lower nozzle plate 40 may include the lower center hole 41 provided in a central portion thereof to be communicated with the lower fluid chamber 17, the flow channel 42 formed in an annular shape along the circumference of the lower center hole 41, a first communicating portion 43 provided in one end portion of the flow channel 42 to be communicated with the lower fluid chamber 17, a first groove portion 44 configured to allow a lower surface of the membrane 60 to be tightly seated, a plurality of coupling rods 45 coupled to the upper nozzle plate 50 and a fixation protrusion 46 fixed to the upper nozzle plate 50 (refer to FIG. 1).

The flow channel 42 is formed in an annular shape along the circumference of the lower center hole 41 to allow the hydraulic fluid to flow from the upper fluid chamber 15 to the lower fluid chamber 17 or from the lower fluid chamber 17 to the upper fluid chamber 15.

The first communicating portion 43 is provided in one end portion of the flow channel 42 to be communicated with the lower fluid chamber 17 and the other end portion of the flow channel 42 is communicated to the upper fluid chamber 15 through a second communicating portion 53 of the upper nozzle plate 50.

Via the first communicating portion 43 and the second communicating portion 53, the hydraulic fluid of the upper fluid chamber 15 may flow to the lower fluid chamber 17 or the hydraulic fluid of the lower fluid chamber 17 may flow to the upper fluid chamber 15.

The first groove portion 44 allows a first edge portion 73 of a first membrane 70 to be tightly coupled thereto to prevent a gap between the lower nozzle plate 40 and the first membrane 70.

The first edge portion 73 of the first membrane 70 is tightly coupled to the first groove portion 44 of the lower nozzle plate 40 to prevent the movement of the first membrane 70 in a circumferential direction of the first membrane 70.

The plurality of coupling rods 45 are formed to protrude upward along the circumference of the lower center hole 41 and may be coupled to a plurality of coupling holes 57 provided in the upper nozzle plate 50.

At least one of the fixation protrusions 46 is provided around the lower center hole 41 so as to be inserted into a fixation hole 59 of the upper nozzle plate 50.

The upper nozzle plate 50 may include the upper center hole 51 provided in the central portion thereof to be communicated with the upper fluid chamber 15, the second communicating portion 53 configured to allow the other end portion of the flow channel 42 to be communicated with the upper fluid chamber 15, a second groove portion 55 configured to allow an upper surface of the membrane 60 to be tightly coupled thereto, a plurality of coupling holes 57 to which the plurality of coupling rods 45 provided in the lower nozzle plate 40 is coupled, and a fixation hole 59 into which the fixation protrusion 46 provided in the lower nozzle plate 40 is inserted (refer to FIG. 1).

The second communicating portion 53 allows the other end portion of the flow channel 42 to be communicated with the upper fluid chamber 15 so that the upper fluid chamber 15 and the lower fluid chamber 17 are communicated with each other via the flow channel 42.

The second groove portion 55 allows a second edge portion 83 of a second membrane 80, described later, to be tightly coupled thereto to prevent a gap between the upper nozzle plate 50 and the second membrane 80.

The second edge portion 83 of the second membrane 80 is tightly coupled to the second groove portion 55 of the upper nozzle plate 50 to prevent the movement of the second membrane 80 in the circumferential direction of the second membrane 80.

The plurality of coupling holes 57 is formed along the circumference of the upper center hole 51 so that the plurality of coupling rods 45 provided in the lower nozzle plate 40 is coupled thereto.

The fixation hole 59 is provided along the circumference of the upper center hole 51 to correspond to a fixation protrusion 47 of the lower nozzle plate 40 so that the fixation protrusion 47 is inserted thereto.

The membrane 60 is mounted between the lower nozzle plate 40 and the upper nozzle plate 50 to improve the vibration characteristics and the damping performance.

A plurality of membranes 60 is provided such that the plurality of membranes 60 having a low hardness has support to each other. Accordingly, the plurality of membranes 60 may act as a single membrane having a high hardness to have a high damping value and durability.

The membrane 60 may include the first membrane 70 disposed on the upper portion of the lower nozzle plate 40 such that an edge of the first membrane 70 is in close contact with the upper portion of the lower nozzle plate 40. The membrane 60 may further include the second membrane 80 disposed on the upper surface of the upper nozzle plate 50 such that an edge of the second membrane 80 is in close contact with the lower portion of the upper nozzle plate 50.

Although the membrane 60 is shown as being formed of two membranes on the drawing, it is not limited thereto and three or more membranes may be provided.

The first membrane 70 and the second membrane 80 are spaced apart by a separation plate 90, which will be described later, so that a flow space (S), as shown in, e.g., FIGS. 1 and 2, is provided between the first membrane 70 and the second membrane 80.

The distance between the first membrane 70 and the second membrane 80 is larger than a vibration displacement of the first membrane 70 or the second membrane 80 when a relatively small amount of vibration displacement is generated in an idling state of the vehicle, but less than a vibration displacement of the first membrane 70 or the second membrane 80 when a relatively large amount of vibration displacement is generated.

A detail description of the flow of the hydraulic fluid in the idling state or the state having the relatively large vibration displacement will be described.

The first membrane 70 may include at least one first communicating hole 71, the first edge portion 73 tightly coupled to the first groove 44 of the lower nozzle plate 40 and a first locking groove 75 to which a first locking protrusion 93 of the separation plate 90 is locked.

The at least one first communication holes 71 is provided on the first membrane 70 so that the lower fluid chamber 17 communicates with the flow space (S).

Although a single first communication hole 71 is illustrated on the drawing, it is not limited thereto and two or more first communication holes may be provided.

The first edge portion 73 protrudes downward from the edge of the first membrane 70 and is tightly coupled to the first groove portion 44 of the lower nozzle plate 40 to prevent a gap between the first membrane 70 and the lower nozzle plate 40 and to prevent the movement of the first membrane 70 in the circumferential direction of the first membrane 70.

The first locking groove 75 is recessed downward in an edge portion of an upper surface of the first membrane 70 and locked to the first locking protrusion 93 of the separation plate 90, thereby preventing movement of the first membrane 70 in the circumferential direction of the first membrane 70.

Since the movement of the first membrane 70 in the circumferential direction of the first membrane 70 is prevented, it may be possible to prevent rattle noise generated when the first membrane 70 moves and collides with the lower nozzle plate 40.

The second membrane 80 may include at least one second communicating hole 81, the second edge portion 83 tightly coupled to the second groove 55 of the upper nozzle plate 50 and a second locking groove 85 to which a second locking protrusion 95 of the separation plate 90 described later is locked.

The at least one second communication hole 81 is provided on the second membrane 80 so that the upper fluid chamber 15 communicates with the flow space (S).

The second communicating hole 81 may be disposed on a different position from the position of the first communicating hole 71 with respect to a vertical direction of the nozzle plate 40 and 50.

Although a single second communication hole 81 is illustrated on the drawing, it is not limited thereto and two or more second communication holes may be provided.

The second edge portion 83 protrudes upward from the edge of the second membrane 80 and is tightly coupled to the second groove portion 55 of the upper nozzle plate 50 to prevent a gap between the second membrane 80 and the upper nozzle plate 50 and to prevent the movement of the second membrane 80 in the circumferential direction of the second membrane 80.

The second locking groove 85 is recessed upward in an edge portion of a lower surface of the second membrane 80 and locked to the second locking protrusion 95 of the separation plate 90, thereby preventing movement of the second membrane 80 in the circumferential direction of the second membrane 80.

Since the movement of the second membrane 80 in the circumferential direction of the second membrane 80 is prevented, it may be possible to prevent rattle noise generated when the second membrane 80 moves and collides with the upper nozzle plate 50.

The separation plate 90 may be disposed between the first membrane 70 and the second membrane 80 to allow the flow space (S) to be provided between the first membrane 70 and the second membrane 80.

The separation plate 90 may be provided in the annular shape, and may include an opening portion 91 in which a central portion thereof is opened so that the flow space (S) is formed between the first membrane 70 and the second membrane 80; the first locking protrusion 93 protruding downward in the lower surface of the separation plate 90 along the circumference of the opening portion 91; the second locking protrusion 95 protruding upward in the upper surface of the separation plate 90 along the circumference of the opening portion 91 and a plurality of through-holes 97 through which the plurality of coupling rods 45 provided in the lower nozzle plate 40 is passed and a fixation groove 99 to which the fixation protrusion 46 provided in the lower nozzle plate 40 is fixed.

Since the first locking groove 75 of the first membrane 70 and the second locking groove 85 of the second membrane 80 are locked to the first locking protrusion 93 and the second locking protrusion 95 of the separation plate 90, thereby fixing the first membrane 70 and the second membrane 80 together, it may be possible to prevent the movement of the first membrane 70 and the second membrane 80 in the circumferential direction of the first membrane 70 and the second membrane 80, respectively.

When the lower nozzle plate 40 and the upper nozzle plate 50 are coupled to each other, a position of the separation plate 90 may be fixed such that the plurality of coupling rods 45 provided in the lower nozzle plate 40 is passed through the plurality of through-holes 97 and then the fixation protrusion 46 is fixed to the fixation groove 99.

Next, a flow path in which the hydraulic fluid flows by the vibration will be described in detail with reference to FIGS. 6 and 7.

Figure 6:
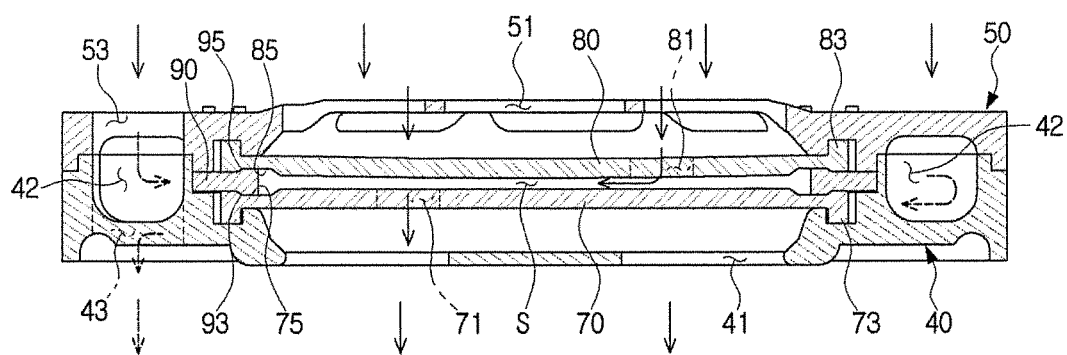
FIG. 6 is a cross-sectional view taken along A-A' of FIG. 3 illustrating a flow path of the hydraulic fluid when idling according to an embodiment of the present disclosure.
Figure 7:
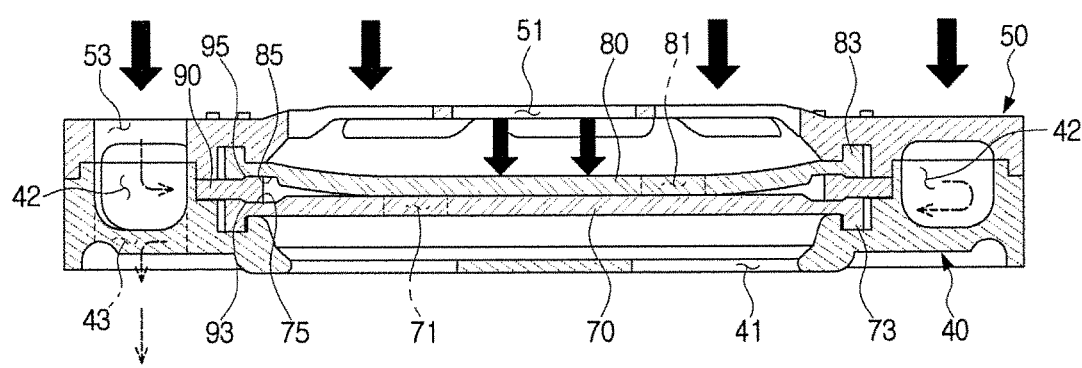
FIG. 7 is a cross-sectional view taken along A-A' of FIG. 3 illustrating a flow path of the hydraulic fluid when the large displacement according to an embodiment of the present disclosure.

FIG. 6 is a cross-sectional view taken along A-A' of FIG. 3 illustrating a flow path of the hydraulic fluid in an idling state according to an embodiment of the present disclosure, and FIG. 7 is a cross-sectional view taken along A-A' of FIG. 3 illustrating a flow path of the hydraulic fluid in a state having a relatively large amount of vibration displacement according to an embodiment of the present disclosure.

As illustrated in FIG. 6, in an idling state in which a relatively small amount of vibration displacement is generated (i.e., vibration occurs in a high frequency band), the first communicating hole 71 formed in the first membrane 70 and the second communicating hole 81 formed in the second membrane 80 may not be blocked since the gap between the first membrane 70 and the second membrane 80 is greater than the vibration displacement of the first membrane 70 or the second membrane 80 in the idling state.

Therefore, the hydraulic fluid of the upper fluid chamber 15 flows to the flow space (S) through the upper center hole 51 and the second communicating hole 81.

The hydraulic fluid flowing to the flow space (S) may flow to the lower fluid chamber 17 through the first communicating hole 71 and the lower center hole 41 and thus the hydraulic fluid of the upper fluid chamber 15 may flow to the lower fluid chamber 17.

Since the first and second membranes 70 and 80 are tightly mounted to the lower nozzle plate 40 and the upper nozzle plate 50, respectively, to prevent a gap from being generated, the hydraulic fluid may flow through only the first communicating hole 71 or the second communicating hole 81.

Some of the hydraulic fluid of the upper fluid chamber 15 may flow to the flow channel 42 through the second communicating portion 53 formed in the upper nozzle plate 50 and the hydraulic fluid flowing to the flow channel 42 may flow to the lower fluid chamber 17 through the first communicating portion 43.

The drawings illustrate that the hydraulic fluid flows from the upper fluid chamber 15 to the lower fluid chamber 17, but is not limited thereto. Therefore, when the hydraulic fluid flows from the lower fluid chamber 17 to the upper fluid chamber 15, the flow direction may be opposite to the above mentioned case, but the flow path may be the same as the above mentioned case.

Since the hydraulic fluid flows through the first communicating hole 71 and the second communicating hole 81, the generation of the rattle noise is prevented and the internal fluid pressure of the hydraulic engine mount is lowered. Accordingly, the dynamic characteristics of the hydraulic engine mount is lowered and thus the noise, vibration, harshness (NVH) performance is improved.

As illustrated in FIG. 7, when a relatively large amount of vibration displacement is generated (i.e., vibration occurs in a low frequency band or a large load occurs), the first communicating hole 71 and the second communicating hole 81 may be blocked by the first membrane 70 and the second membrane 80 since the gap between the first membrane 70 and the second membrane 80 is less than the displacement of the first membrane 70 or the second membrane 80 when the relatively large vibration displacement is generated.

Since the first and second membranes 70 and 80 are tightly mounted to the lower and upper nozzle plates 40 and 50, respectively, to prevent the gap, when the first communicating hole 71 and the second communicating hole 81 are blocked, the hydraulic fluid of the upper fluid chamber 15 may flow to the lower fluid chamber 17 through the flow channel 42.

Since the hydraulic fluid of the upper fluid chamber 15 flows to the lower fluid chamber 17 through only the flow channel 42, the high damping value may be generated.

The drawings illustrate that the hydraulic fluid flows from the upper fluid chamber 15 to the lower fluid chamber 17, but is not limited thereto. Therefore, when the hydraulic fluid flows from the lower fluid chamber 17 to the upper fluid chamber 15, the flow direction may be opposite to the above mentioned case, but the flow path may be the same as the above mentioned case.

As is apparent from the above description, according to the proposed hydraulic engine mount, in the idling state, it may be possible to improve Noise, Vibration, and Harshness (NVH) performance by lowering dynamic characteristics of the hydraulic engine mount while preventing the rattle noise, and it may be possible to generate the high damping value when the relatively large vibration displacement is generated.

It may be possible to improve the durability of the membrane.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A hydraulic engine mount comprising:
a case having a hydraulic fluid sealed therein;
a nozzle plate having a lower nozzle plate and an upper nozzle plate coupled to an upper portion of the lower nozzle plate, and dividing an inside of the case into an upper fluid chamber and a lower fluid chamber;
a first membrane disposed on the upper portion of the lower nozzle plate such that a first edge portion of the first membrane is tightly coupled to the upper portion of the lower nozzle plate, and provided with at least one first communicating hole;
a second membrane disposed on a lower portion of the upper nozzle plate such that a second edge portion of the second membrane is tightly coupled to the lower portion of the upper nozzle plate, and provided with at least one second communicating hole; and
a separation plate allowing the first membrane and the second membrane to be apart from each other so as to provide a flow space between the first membrane and the second membrane,
wherein the separation plate has an annular shape, and the separation plate comprises an opening portion of which a central portion is opened to form the flow space.

2. The hydraulic engine mount of claim 1, wherein
the at least one first communicating hole and the at least one second communicating hole are disposed in different positions with respect to a vertical direction of the nozzle plate.

3. The hydraulic engine mount of claim 2, wherein
a lower center hole communicated with the lower fluid chamber is provided in a central portion of the lower nozzle plate and an upper center hole communicated with the upper fluid chamber is provided in a central portion of the upper nozzle plate.

4. The hydraulic engine mount of claim 3, wherein
the lower nozzle plate comprises:
a flow channel formed in an annular shape along a circumference of the lower center hole to allow the hydraulic fluid to flow from the upper fluid chamber to the lower fluid chamber or from the lower fluid chamber to the upper fluid chamber; and
a first communicating portion provided in one end portion of the flow path to allow the flow channel to be communicated with the lower fluid chamber.

5. The hydraulic engine mount of claim 4, wherein
the upper nozzle plate comprises a second communicating portion configured to allow another end portion of the flow channel to be communicated with the upper fluid chamber.

6. The hydraulic engine mount of claim 5, wherein
a distance between the first membrane and the second membrane is greater than a displacement of the first membrane or the second membrane when a relatively small amount of vibration is generated in an idling state.

7. The hydraulic engine mount of claim 6, wherein
in the idling state, the hydraulic fluid of the upper fluid chamber flows to the flow space by passing through the upper center hole and the at least one second communicating hole, and then flows to the lower fluid chamber by passing through the at least one first communicating hole and the lower center hole.

8. The hydraulic engine mount of claim 6, wherein
in the idling state, the hydraulic fluid of the lower fluid chamber flows to the flow space by passing through the lower center hole and the at least one first communicating hole and then flows to the upper fluid chamber by passing through the at least one second communicating hole and the upper center hole.

9. The hydraulic engine mount of claim 5, wherein
a distance between the first membrane and the second membrane is less than a displacement of the first membrane or the second membrane when a relatively large amount of vibration is generated.

10. The hydraulic engine mount of claim 9, wherein when the relatively large amount of vibration is generated,
the at least one first communicating hole and the at least one second communicating hole are blocked by the second membrane and the first membrane, respectively, and
the hydraulic fluid of the upper fluid chamber is prevented from flowing to the lower fluid chamber through the flow space, and the hydraulic fluid of the lower fluid chamber is prevented from flowing to the upper fluid chamber through the flow space.

11. The hydraulic engine mount of claim 10, wherein
when the relatively large amount of vibration is generated, the hydraulic fluid of the upper fluid chamber and the lower fluid chamber flows through only the flow channel.

12. The hydraulic engine mount of claim 1, wherein
the separation plate comprises:
a first locking protrusion protruding downward along a circumference of the opening portion; and
a second locking protrusion protruding upward along the circumference of the opening portion.

13. The hydraulic engine mount of claim 12, wherein
the first membrane comprises the first edge portion protruding downward from an edge of the first membrane and a first locking groove being recessed downward from an edge portion of an upper surface of the first membrane.

14. The hydraulic engine mount of claim 13, wherein
the second membrane comprises the second edge portion protruding upward from an edge of the second membrane and a second locking groove being recessed upward from an edge portion of a lower surface of the second membrane.

15. The hydraulic engine mount of claim 14, wherein
the lower nozzle plate comprises a first groove portion tightly coupled to the first edge portion and the upper nozzle plate comprises a second groove portion tightly coupled to the second edge portion.

16. The hydraulic engine mount of claim 15, wherein
movement of the first membrane in a circumferential direction of the first membrane is prevented, by having the first edge portion fixed to the first groove portion of the lower nozzle plate and the first locking protrusion of the separation plate locked to the first locking groove.

17. The hydraulic engine mount of claim 15, wherein
movement of the second membrane in a circumferential direction of the second membrane is prevented, by having the second edge portion fixed to the second groove portion of the upper nozzle plate and the second locking protrusion of the separation plate locked to the second locking groove.

* * * * *